United States Patent

[11] 3,599,019

[72] Inventors: Yasuo Nannichi; Susumu Ito, both of Tokyo, Japan
[21] Appl. No.: 750,793
[22] Filed: Aug. 7, 1968
[45] Patented: Aug. 10, 1971
[73] Assignee: Nippon Electric Company, Limited, Tokyo-to, Japan
[32] Priority: Aug. 25, 1967
[33] Japan
[31] 42/55083

[54] LASER DEVICE WITH SELECTIVE OSCILLATION
8 Claims, 5 Drawing Figs.

[52] U.S. Cl. .................. 307/312, 307/311, 331/94.5
[51] Int. Cl. .................. H01s 3/10
[50] Field of Search .................. 307/312

[56] References Cited
UNITED STATES PATENTS
3,431,437  3/1969  Kosonocky .................. 307/312

Primary Examiner—Roy Lake
Assistant Examiner—Darwin R. Hostetter
Attorney—Hopgood and Calimafde ABSTRACT: A laser oscillator of more than two stable states includes a closed loop optical circuit including a laser amplifier, and two light absorbers, the latter being, for example, GaAs PN junctions. Means such as an independent light source or voltage triggers are provided for selectively emphasizing a light beam of at least one specific propagation direction, thereby reducing the absorption coefficient and generating a stable oscillation state in that propagation direction.

INVENTORS
YASUO NANNICHI
SUSUMU ITO

BY Hopgood & Calimafde
ATTORNEYS

LASER DEVICE WITH SELECTIVE OSCILLATION

BACKGROUND OF THE INVENTION

The concept of using active light elements for information storage is not new. The use of laser action for information storage is generally based upon the discrimination of the presence and absence of laser oscillation. Examples of such conventional active elements are found in "Applied Physics Letters" 1963, vol. 3, PP. 1—3, and "I.B.M. Journal R & D" 1964, vol. 8, PP. 471—475. The devices disclosed in these articles may be called flip-flop laser device and have two stable states making them suitable for use as an information storage element. For the device to serve as a logic element, however, a number of similar active elements would have to be combined. This creates difficulties which may be solved by providing a device which has three or more stable states. However, it has heretofore been impossible to give the multiple stability states to the conventional active elements. Accordingly, it is the object of this invention to provide a laser device having more than two stable states.

SUMMARY OF INVENTION

Briefly, the invention is predicated upon the concept of providing a laser device with oscillation-direction-selection capability having three or four stable states wherein a laser oscillator and an element having a nonlinear absorption coefficient are combined so as to make it possible to select the light oscillation or light propagation direction.

Generally, a closed optical circuit is necessary to obtain laser oscillation. Since a laser oscillator is a light source and, at the same time, a kind of light amplifier, laser oscillation is caused if the closed optical circuit has an amplification factor large enough to overcome its light absorption. It is possible therefore to control the propagation direction of the generated laser light by use of a material with nonlinear absorption coefficient as the absorber.

The above-mentioned and other features and objects of this invention and the manner of attaining them will become more apparent and the invention itself will best be understood by reference to the following description of embodiments of the invention taken in conjunction with the accompanying drawings, the description of which follows, Wherein FIG. 1 is a transmitted light intensity vs. incident light intensity characteristic curve of gallium arsenide;

Figure 4A:
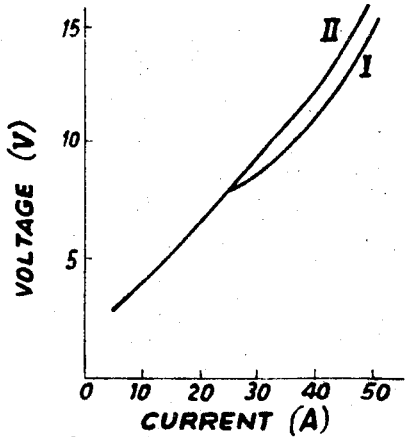

FIGS. 4a and b are curves for explaining the principles of these embodiments.

DETAILED DESCRIPTION OF THE DRAWINGS

Figure 1:
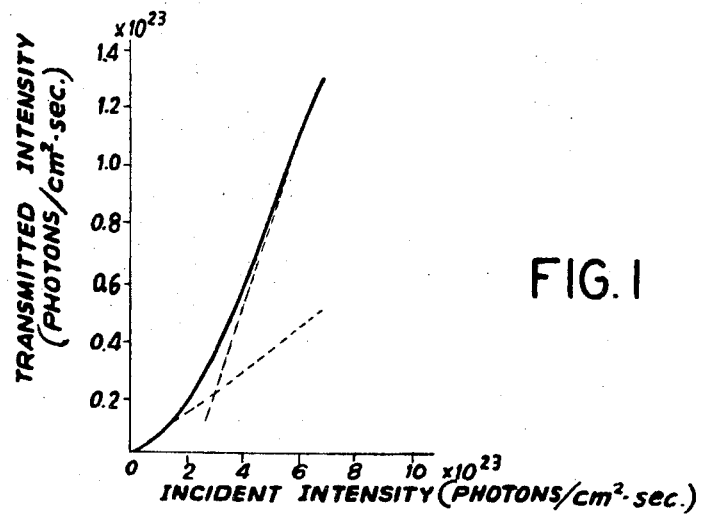

Now, the invention will be explained referring to the drawings. FIG. 1 shows the transmitted light intensity vs. incident light intensity for characteristic curve of gallium arsenide (GaAs), an example of a nonlinear light absorber, as described in Applied Physics Letters, vol. 6, No. 6, PP. 101-102, 1965. Many other materials exist that have the nonlinear absorption coefficient.

Figure 2:
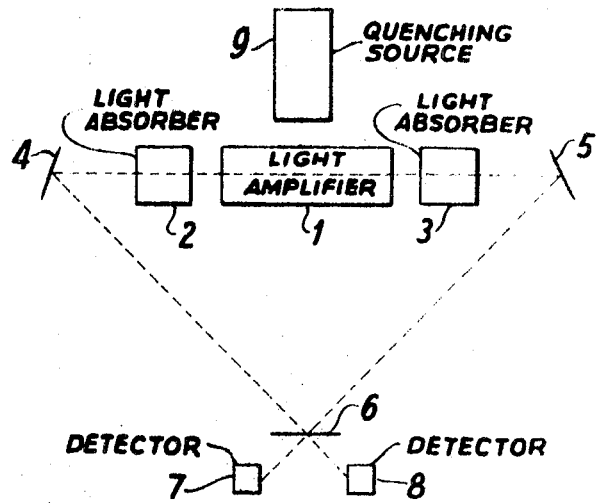
FIG. 2 is a schematic diagram of one embodiment of this invention.

In FIG. 2, an embodiment of this invention consists of a light amplifier 1, nonlinear light absorbers 2 and 3, reflecting mirrors 4, 5 and 6, light-propagation-direction detectors 7 and 8, and a quenching light source 9. The dotted line indicates the light path. Both ends of the light amplifier 1 are finished to nonreflective surfaces so that the amplifier 1 may not cause the laser oscillation by itself.

Assuming that the amplification factor of the light amplifier 1 is $g$, the transmission factors of the absorbers 2 and 3 are $t_2$ and $t_3$ respectively, and the light intensity emitted from both ends of the amplifier 1 is $I_o$, the intensity $i_l$ of the counterclockwise light beam is given, when returned to the initial position, by $$i_l = I_o \alpha t_2 t_3 g,$$

where $\alpha$ is the reflectivity of the reflecting mirrors 4, 6 and 5. Similarly, the intensity $i_r$ of the clockwise slight beam is given, when returned to the initial position, by $$i_r = I_o \alpha t_2 t_3 g,$$ The laser oscillation does not occur if $$\alpha t_2 t_3 g < 1$$

Now, an additional counterclockwise light beam $I_o$ is superposed on the light oscillation, amplified to $\beta I_o$ and made incident on the absorber 3.

Then, at this greater intensity the transmission coefficient of the absorber 3 is increases from $t_3$ to $t'_3$. The light beam transmitted through the absorber 3 is amplified by the amplifier 1 and transmitted through the absorber 2 (the transmission factor $t_2'$), and returns to the initial position with the intensity $$i'_l = \beta I_o \alpha t_2' t_3' g.$$ If, $$\alpha t_2' t_3' g = 1$$

is attained, the light intensity circulating the closed optical circuit is maintained constant even after the external light pulse is removed. Thus, the laser oscillation is triggered.

On the other hand, oscillation of the clockwise light beam is not caused before the counterclockwise light beam initiates oscillation. Insofar as the input energy applied to the amplifier 1 is maintained constant, the initiation of the counterclockwise light beam reduces the amplification factor for the clockwise light to a value below that for the counterclockwise light beam (known as the quenching phenomenon). Then, the intensity of the light, when returned to the initial position, expressed by $$i'_r = I_o \alpha t_2' t_3' g',$$

is not sufficient to cause laser oscillation because of the decreased amplification factor $g'$.

A similar selective oscillation can be performed by directing an additional ray of light independent of counterclockwise light beam $I_o$ to the absorber 2, instead of superposing an external light pulse on the light beam $I_o$. Alternatively, when a semiconductor PN junction is used as the absorber 2, the control of forward current to change the transmission factor brings forth same result.

Figure 3:
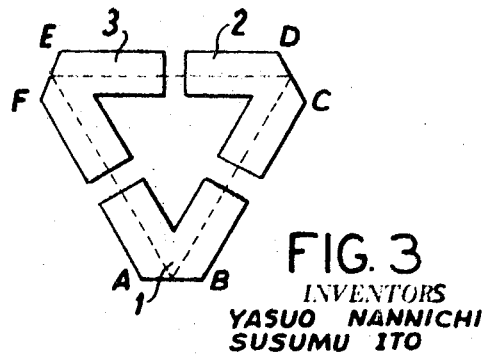
FIG. 3 is a schematic diagram of another embodiment of this invention.

In the second embodiment shown in FIG. 3 semiconductor PN junctions are used as the absorbers 2 and 3, which are connected to a constant voltage source. When a light beam is incident on the junctions, this electric conductivity acts to increase the current. Since the increased current enhances the amplification of the incident light, the transmission factor of the junctions eventually increases as will be explained.

Figure 4B:
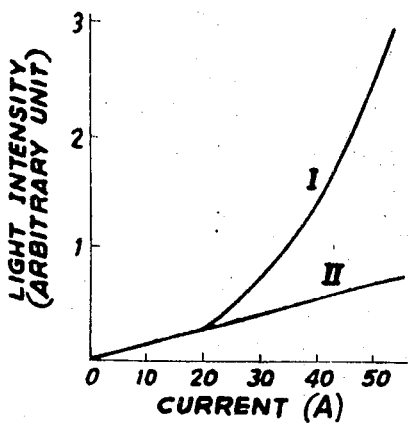

FIG. 4 illustrates the above-mentioned relation between the current flowing through the junction and the voltage applied across the junction. Further details not necessary for an understanding of this invention may be had by reference to the "Japanese Journal of Applied Physics," vol. 3, PP. 233—234, 1964. In FIG. 4(a), when the diodes (I) and (II) are connected to a power supply of 10V, for example, the current through the diode (I) in which the laser oscillation occurs is greater than that through the diode (II) in which the laser oscillation does not occur. The intensity of light emerging from each of the diode (I) and (II) is shown in FIG. 4(b). As is shown, the intensity of light emerging from diode (I) is more than twice as large as that of diode (II). Thus, the light intensity increase in the diode (I) is caused by the increase in the electric conductivity due to the strong incident light. This raises the transmission factor of the diode (I), as will be further explained later.

Referring again to FIG. 2, when a short pulse voltage is applied to the absorber 3 formed of semiconductor PN junction, a part of carriers injected into the PN junction contributes to the amplification of the incident light as mentioned above. As a result, the transmission factor is changed from $t_3$ to $t_3'$. The counterclockwise light beam $I_o \alpha t_2$ is changed to $I_o \alpha t_2 t_3'$ after passing through the absorber 3, and is made incident on the amplifier 1. Thus, this light is amplified to $I_o \alpha t_2 t_3' g$ and is made incident on the absorber 2. The current flowing through the absorber 2 increases on receiving the light, and the transmission factor is changed to $t_2'$. The light propagates further and returns to the absorber 3. Though the driving pulse is turned off at that time, the transmission factor takes the value $t_3$ again, maintaining the light intensity constant. The relation to be satisfied for maintaining oscillation is expressed by $$\alpha t'_2 t_3 g = 1.$$

On unidirectional other hand, the clockwise light beam emerging from the absorber 3 triggered by a driving pulse enters into the amplifier 1 after the counterclockwise light beam has entered into the amplifier 1. The amplifier factor ($g'$) of the amplifier 1 for the clockwise light beam is smaller than that for the counterclockwise light beam because the principal part of the input energy applied to the amplifier 1 has been consumed for the amplification of the counterclockwise light. For this reason, the relation $$\alpha t'_2 t_3 g' < 1$$

holds and the laser oscillation for the clockwise light beam is not initiated. Thus, the laser oscillation is caused on a unidirectional basis.

The laser oscillation can be stopped by pulsatingly reducing the amplification factor of the amplifier, because the intensity of the light output beam reduces and the transmission factor again takes the initial value. As a practical matter, the discontinuation of laser oscillation may be attained by quenching with the light source 9 to reduce the amplification factor of the amplifier 1. The direction of the laser oscillation can be altered by once stopping the laser oscillation by means of the light source 9 and after that either by introducing an external light pulse in the opposite direction, or by increasing the transmission factor of the absorber 2. The laser oscillation can be detected by the detectors 7 and 8, or by measuring the current flowing through the absorbers 2 and 3, when the semiconductor PN junctions are used for the absorbers 2 and 3.

The second embodiment of this invention shown in FIG. 3 is of the integrated circuit type and all the components consist of PN junctions. In place of the reflection mirrors, the reflection is achieved by the portion of the light amplifier 1 and the absorbers 2 and 3. The condition for initiating the laser oscillation is similar to that of the first embodiment shown in FIG. 2. The laser oscillation can be stopped by pulsatingly reducing the current flowing through the amplifier 1 or the absorbers 2 and 3.

Most typically, the second embodiment is formed of PN junctions of GaAs at the amplifier 1 and the absorbers 2 and 3. When the current flows through the GaAs PN junction, the amplification factor of the amplifier 1 and the transmission factors of the absorbers 2 and 3 are all expressed by $$\alpha_o \cdot \exp(-k+\beta J)l$$

where, $k$ is the absorption coefficient, $J$ is the density of the current flowing through the PN junction, $\beta$ is a constant representing the amplification factor of the light, $l$ is the light path length for the light passing through the amplifier 1, the absorbers 2 or 3, and $\alpha_o$ is the reflectivity of the surfaces A B, C D and E F. Designating the refractive index of GaAs by $n$, and that of the medium around GaAs by $n_o$, the total reflection occurs if the angle ⑪ between the normal of the incident surface and the incident light satisfies the inequality $$\sin ⑪ > n_o/n,$$

in accordance with the law of reflection and refraction. Taking E F. $n=3.6$ for the laser light of GaAs, total reflection occurs if ⑪ $>16°8'$ when the reflective index of the surrounding medium $n_o=1$, or ⑪ $19°28'$ when $n_o=1.2$ (corresponding to the case of liquid nitrogen as the medium). In the regular triangular form shown in FIG. 3, the angle between the normal of the surface A B, C D or E F and the incident light satisfies ⑪ $=30°$, so that the total reflection occurs and $\alpha_o=1$ holds. Since the light is perpendicularly introduced to the both ends of the amplifier 1 and the absorbers 2 and 3, and since both the ends are subjected to nonreflecting working so as to maintain the reflectivity R below 1 percent, the reflection loss can be assumed to the negligible. Taking $\alpha=1$ and $R<1$ percent, an amplifier is provided when $$(-k+\beta J) l > 0$$

and an absorber is provided when $$(-k+\beta j) l > 0$$

Evidently, the transmission factor varies with the change in the current density $J$ of current flowing through the PN junction. For the usual GaAs laser light, the values of $k$ and $\beta$ are about 50 cm.$^{11}$, and 0.05 cm./A respectively, at the liquid nitrogen temperature. On the other hand, the laser light beam, while considered to propagate without divergence, actually diverges by about 10° in all direction in the case of GaAs. This divergence causes losses in the light beams passing from the amplifier 1 to the absorber 2, from the absorber 2 to the absorber 3 and so on. The rate of loss $\theta$ varies with the distance between the amplifier 1 and the absorbers 2 or 3, or between the absorbers 2 and 3. Designating the current density of the amplifier 1 by $J_1$, that of the absorbers 2 and 3 by $J$, and the length of the amplifier 1 and the absorbers 2 and 3 by the same $l$, for simplicity, the laser oscillation does not occur if $(\alpha_o)^3 \cdot \theta \cdot t_2 \cdot t_3 \cdot g = \theta \cdot \exp[$ If $3k + \beta(J_1 + 2J)]l < 1$, or $\beta(J_1 = 2J) < 3k = 1/l \ln 1/\theta$. If the current density of the absorber 3 is raised by $\Delta J_3$, the light intensity incident on the absorber 2 becomes $\exp \beta \Delta J_3 l$ times as large. Assuming the current density of the absorber 2 increases by $\Delta J_2$ by the increase of the incident light intensity, the laser oscillation occurs if $$\beta(J_1 = 2J = \Delta J_2 = 3K + 1/p \ln 1/\theta.$$

Taking, for example, $l=500\mu$, $\theta=0.8$, $J_1=2288$ A/cm.$^2$ and $J=400$ A/cm.$^2$, the laser oscillation does not occur because $$3k + 1/l \ln 1/\theta = 154.5,$$

and $$\beta(J_1 + 2J) = 154.4124.$$

If the additional current $\Delta J_3 = 520$ cm.$^2$ is superposed on the current flowing through the absorber 3, the light intensity incident on the absorber 2 becomes as $$\exp \beta \Delta J_3 l = 3.7$$

times as large. If the current flowing through the absorber 2 is increased by 1 percent by the increase of the incident light intensity, the condition for the laser oscillation to occur is fulfilled because $$\Delta J_2 = 4 \text{ A/cm.}^2$$

and $$\beta(j_1 + 2J + \Delta J_2) = 154.6 > 3k + 1/l \ln 1/\theta.$$

As can be understood from this example, there is much flexibility in the design by adjusting the lengths of the amplifier 1 and the absorbers 2 and 3, the current value, and the loss of laser light due to dispersion. To summarize, the invention provides three stable states; namely (1) no laser oscillation in any direction, (2) laser oscillation in the counterclockwise direction, and (3) laser oscillation in the clockwise direction. This means the element can serve as a memory element. Also in the other region of operation, i.e., when the input energy of the amplifier is increased, the laser oscillations both in the counterclockwise and clockwise directions can be produced at the same time, and so a four valued memory element is realized.

While the principles of the invention have been described in connection with specific apparatus, it is to be clearly understood that this description is made only by way of example and not as a limitation to the scope of the invention as set forth in the objects thereof and in the accompanying claims.

For example, the device of this invention may be modified to have more stabilities than the embodiments mentioned above, by optically combining additional amplifiers and/or absorbers.

We claim:

1. A laser device with oscillation-direction-selection capability comprising at least one laser amplifier; two light absorbers of nonlinear absorption coefficient respectively arranged to each end of said amplifier and establishing a closed optical path with said amplifier; and means in communication with said optical circuit for selectively emphasizing a light beam of at least one specific propagation direction in said optical circuit thereby causing reduction in said nonlinear absorption coefficient where by a plurality of stable states of said device are respectively defined by the presence, absence and propagation direction of the generated laser oscillation, and a pair of detector means disposed in said closed optical path for detecting the light propagation direction of the generated laser oscillation.

2. The laser device claimed in claim 1, wherein said light absorbers comprise semiconductor PN junctions.

3. The laser device claimed in claim 2, wherein said means for selectively emphasizing a light beam of at least one specific propagation direction comprises means for controlling the forward current of said PN junctions.

4. The laser device claimed in claim 1, wherein the means for emphasizing alight beam of at least one specific propagation direction comprises an independent light source.

5. The laser device claimed in claim 1, further comprising means for reducing the amplification factor of said amplifier, thereby halting laser oscillation.

6. The laser device claimed in claim 5, wherein said means for reducing the amplification factor comprises means for reducing the amplification current.

7. The laser device claimed in claim 5, wherein the means for reducing the amplification factor comprises a quenching light source.

8. The laser device of claim 1, which said light beam selective emphasizing means comprises means for temporarily intensifying the light wave in said closed optical path in one direction, and means for selectively decreasing the absorption coefficient of at least one of said nonlinear absorbers.